Patented July 4, 1944

2,353,010

UNITED STATES PATENT OFFICE 2,353,010

COMPOUNDS OF THE ANTHRAQUINONE SERIES

Edwin C. Buxbaum, Media, Pa., assignor to E. I. du Pont de Nemours & Company, Wilmington, Del., a corporation of Delaware No Drawing. Application October 24, 1942, Serial No. 463,248

4 Claims. (Cl. 260—378)

This invention relates to new compounds of the anthraquinone series which are useful as dyes for cellulose acetate and which may also be employed as intermediates in the preparation of other dyes. The invention relates more particularly to the preparation of new 1,4-diamino-2-nitroanthraquinone compounds which carry in the benzene ring, remote from the one in which the amino groups are attached, at least one negative substituent of the group consisting of nitro-hydroxy, methoxy and halogen.

Although there are a number of dyes in the field of the cellulose acetate dyes which dye in blue shades, they are in general deficient in gas-fume fastness. Most of these blue dyes, when applied to cellulose acetate, fade on storage in the presence of nitrous acid fumes, and are thereby converted to undesirable colors. While a few dyes have been produced in the blue range that are alleged to have improved gas-fume fastness, these dyes have been found to be deficient in other properties, such as affinity for the fiber, thereby resulting in slow exhaustion from the dye bath and the inability to exhaust the bath at relatively low temperatures. Certain of these colors also do not have the property of building up in the strong shades which is desirable in the cellulose acetate dye class.

It is therefore an object of this invention to prepare compounds of the anthraquinone series which dye cellulose acetate in blue shades of improved fastness to gas fumes, and which will have the property of building up in strong shades on the filter and which will exhaust rapidly and completely from the dye bath.

I have found that by introducing a negative substituent of the group consisting of nitro, hydroxy, alkoxy and halogen in the 5, 6, 7 or 8 position of the 1,4-diamino-2-nitroanthraquinone, new cellulose acetate dyes can be produced which dye this fiber in blue shades and which exhibit improved dyeing properties and improved fastness to gas fumes.

The 1,4-diamino-2-nitro-anthraquinone itself dyes cellulose acetate in bright greenish-blue shades which have fairly good fastness to light and gas fumes, but this compound is deficient in its application properties. By the introduction of a negative substituent of the group above mentioned in the benzene nucleus of the anthraquinone molecule remote from that which carries the amino groups, new compounds are produced which exhibit good fastness to gas fumes when dyed on cellulose acetate silk, and which have greatly improved dyeing properties.

These new compounds also dye in much redder shades of blue than the 1,4-diamino-2-nitro-anthraquinone, which is a highly desirable property, for they may be employed in the preparation of navy blue shades on cellulose acetate which have heretofore been difficult to obtain in colors that have the required fastness to light and fastness to gas fumes. This is because the red dyes for cellulose acetate, which must be used to mix with the greenish-blue dyes to give the navy blue shades, are deficient in light fastness. Furthermore, the 5-nitro substitution derivative of the 1,4-diamino-2-nitro-anthraquinone has unexpected tinctorial strength and affinity for cellulose acetate fiber as compared to the 1-4-diamino-2-nitro-anthraquinone itself. It builds up in much stronger shades than the 1,4-diamino-2-nitro-anthraquinone, and dyes much more rapidly at lower temperatures. This effect was quite unexpected, because the introduction of the negative groups into many of the cellulose acetate dyes generally produces the opposite effect.

The following examples are given to illustrate the invention. The parts used are by weight.

Example 1

Twenty-eight and three-tenths parts of 1,4-diamino-5-nitro-anthraquinone, prepared as described in D. R. P. 268,984, are added to 300 parts of nitrobenzene under agitation. There are then added 35 parts of benzoylchloride, and the mixture is heated to 140° to 150° C. and held there until the reaction is completed, as evidenced by the cessation of the evolution of hydrochloric acid fumes. The benzoylation mass is then allowed to crystallize slowly. The new compound which comes out in red-brown crystals is 1,4-dibenzoylamino-5-nitro-anthraquinone. It has a melting point of 281° C. It can be easily reduced to the corresponding 5-amino-1,4-dibenzoyl-amino-anthraquinone by any methods usually employed in reducing nitro groups to amine groups in the anthraquinone class.

These compounds are useful as intermediates for further condensation both for dyes for wool, acetate or vat dyes.

Example 2

Twenty-four and six-tenths parts of the 1,4-dibenzoyl-amino-5-nitro-anthraquinone, described in Example 1, are suspended in 158 parts of nitrobenzene. The suspension is heated to 90° C., at which point solution is complete. There are then added 30 parts of 70% nitric acid over a period of one to two hours, while holding the temperature at 90°–95° C. After the addition of the nitric acid the nitration mixture is held at 90°–95° C. for an additional two hours. Upon cooling, the 1,4-dibenzoylamino-2,5-dinitroanthraquinone precipitates out in the form of orange-red needles.

Ten parts of the above compound are dissolved in one hundred parts of 93% sulfuric acid and the temperature raised to 60°–70° C. and held there for one hour. The solution is then poured into 1000 parts of ice and water, filtered, washed acid-free and made into a paste or powder suitable for dyeing cellulose acetate or similar fibers. The resulting 1,4-diamino-2,5-dinitroanthraquinone dyes cellulose acetate and related fibers in bright reddish-blue shades of excellent fastness to light and very good fastness to gas fumes. It also exhibits good application properties.

*Example 3*

Thirty-eight parts of 1,4-diamino-5-hydroxyanthraquinone (prepared by the oxidation of leuco - 1,4 - diamino - 5 - hydroxy - anthraquinone, which is in turn prepared by the amidation with ammonia and sodium-hydrosulfite of leuco-1,4,5-trihydroxy anthraquinone) are reacted with 180 parts of nitrobenzene and 52 parts of benzoyl chloride at 130°–140° C. until benzoylation is complete. The reaction mass is then cooled to room temperature, filtered, and the resulting 1,4 - dibenzoylamino - 5 - hydroxyanthraquinone is washed and dried.

Twenty-three parts of the above compound are dissolved in 120 parts of nitrobenzene at 90° C. There is then added, at 90° C. over a period of from one to two hours, 29 parts of 70% nitric acid. The temperature is held at 90°–95° C. for an additional two hours and then cooled to 30° C. The resulting 1,4-dibenzoylamino-2-nitro-5-hydroxyanthraquinone is filtered off, washed and dried.

By hydrolyzing this dibenzoylamino-compound in concentrated sulfuric acid, the 1,4-diamino-2-nitro-5-hydroxyanthraquinone is obtained, which dissolves in concentrated sulfuric acid with a yellow color that changes to a bright blue on the addition of para-formaldehyde, and to a dull violet on the addition of boric acid. In organic solvents it dissolves, on heating, with a pure blue color. It dyes cellulose acetate in reddish-blue shades of excellent light fastness.

*Example 4*

Fifty-five parts of 1,4-diamino-6-chloro-anthraquinone are added to a solution of 350 parts of ortho-dichloro-benzene and 100 parts of benzoyl chloride at 60°–70° C. The mixture is then heated to 120°–130° C. and held under agitation for a period of two hours. The benzoylation mass is then allowed to cool to 30° C., and the resulting crystalline mass is filtered, the filter cake being washed, in turn, with ortho-dichloro-benzene, alcohol and hot water.

Forty-eight parts of the 1,4-dibenzoylamino-6-chloro-anthraquinone thus obtained are suspended in 240 parts of nitrobenzene and heated to 90° C. There are then added, over a period of from one to two hours, 57.6 parts of 70% nitric acid. After the addition of the nitric acid, the nitration mass is held at 90°–95° C. for an additional two hours. It is then cooled to room temperature and filtered. The resulting 1,4-dibenzoylamino - 2 - nitro - 6 - chloroanthraquinone is washed with alcohol, then with hot water and dried, and is obtained in the form of orange-red crystals. Thirty-five parts of this compound are dissolved in 300 parts of 93% sulfuric acid and heated to 60°–70° C. for one hour. The hydrolysis mixture is then cooled to 30° C., and there are then added, over a period of two hours at a temperature of 20°–30° C., 110 parts of water. The resulting 1,4-diamino-2-nitro-5-chloroanthraquinone comes out of solution in crystalline form and is filtered off, washed with diluted sulfuric acid, and then resuspended in 1000 parts of hot water. The blue suspension is filtered, and the cake is then washed with hot water until acid free, and dried. It dyes cellulose acetate in beautiful level red-blue shades, and has excellent affinity for the fiber and other desirable application properties.

*Example 5*

If, in the preceding example, one starts with 1,4 - diamino - 5 - chloroanthraquinone and proceeds through the steps of benzoylation, nitration and hydrolysis as in Example 4, the 1,4-diamino-2-nitro-5-chloroanthraquinone will be obtained which dyes in similar shades and has properties similar to the product of Example 4.

By varying the substituents in the benzene ring of the anthraquinone nucleus remote from that which carries the amino groups, it is possible to produce a variety of blue shades.

While in the examples the starting compound employed was one which contained a substituent in the benzene ring remote from the one carrying the amine groups, this is not necessary, for compounds which exhibit the same desirable properties may be produced by chlorination, nitration, etc., of the 1,4-diamino-2-nitro-anthraquinone. However, by starting with the 1,4-diaminoanthraquinone which carries the desired substituent in the 5, 6, 7 or 8 position, one obtains compounds of higher purity than are possible by the alternate route.

I claim:
1. A 1,4-diamino-2-nitroanthraquinone which carries in the benzene ring of the anthraquinone molecule remote from that which carries the amino groups, a substituent of the group consisting of nitro, hydroxy, methoxy and halogen.
2. 1,4-diamino-2,5-dinitroanthraquinone.
3. 1,4-diamino-2-nitro-5-chloroanthraquinone.
4. 1,4 - diamino - 2 - nitro - 5 - hydroxyanthraquinone.

EDWIN C. BUXBAUM.